United States Patent
Grivetti et al.

(10) Patent No.: US 9,702,144 B2
(45) Date of Patent: Jul. 11, 2017

(54) EXTRUDED WALLS AND METHOD OF FORMING EXTRUDED WALLS

(71) Applicant: Caterpillar Inc., Peoria, IL (US)

(72) Inventors: Tazio Stephan Grivetti, Chillicothe, IL (US); Aaron Kenneth Amstutz, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/844,339

(22) Filed: Sep. 3, 2015

(65) Prior Publication Data
US 2017/0067251 A1    Mar. 9, 2017

(51) Int. Cl.
*E04B 1/16*    (2006.01)
*E04B 2/84*    (2006.01)

(52) U.S. Cl.
CPC ............ *E04B 2/84* (2013.01); *E04B 2103/02* (2013.01)

(58) Field of Classification Search
None
See application file for complete search history.

(56) References Cited

U.S. PATENT DOCUMENTS

| | | | |
|---|---|---|---|
| 1,894,679 A | 1/1933 | Folmsbee | |
| 2,717,420 A * | 9/1955 | Roy | B27N 3/28 100/232 |
| 3,275,719 A * | 9/1966 | Dudson | E04B 1/3516 264/33 |
| 3,331,170 A * | 7/1967 | Lowe | E04B 1/348 52/143 |
| 4,424,194 A * | 1/1984 | Hughes | C04B 38/04 106/792 |
| 5,735,090 A | 4/1998 | Papke | |
| 6,528,151 B1 | 3/2003 | Shah et al. | |
| 7,153,454 B2 | 12/2006 | Khoshnevis | |
| 7,276,194 B2 | 10/2007 | Shalkey | |
| 7,452,585 B1 * | 11/2008 | Wong | C08J 9/32 264/176.1 |
| 9,068,340 B2 * | 6/2015 | Austin | E04B 1/348 |
| 2004/0021246 A1 * | 2/2004 | Zikeli | D01D 5/06 264/143 |
| 2007/0138678 A1 * | 6/2007 | Khoshnevis | B28B 1/16 264/34 |
| 2008/0313972 A1 | 12/2008 | Grob et al. | |
| 2011/0287119 A1 * | 11/2011 | Fellabaum | B29C 47/0004 425/113 |
| 2014/0026509 A1 | 1/2014 | Dincel | |
| 2014/0252668 A1 | 9/2014 | Austin et al. | |
| 2015/0115492 A1 * | 4/2015 | Franke | B28B 1/008 264/69 |

FOREIGN PATENT DOCUMENTS

| | | | |
|---|---|---|---|
| GB | 619048 A * | 3/1949 | ............ B28B 23/02 |
| WO | 2014121917 | 8/2014 | |

* cited by examiner

*Primary Examiner* — Elizabeth A Quast
(74) *Attorney, Agent, or Firm* — Tim A. Parker; Edward Lin

(57) ABSTRACT

A wall may be formed by a method comprising providing an extrusion platform having a plurality of perforations extending through a surface of the extrusion platform, and extruding a cementitious composite through the perforations of the extrusion platform to grow a plurality of cementitious composite rods each extending from a respective one of the perforations. The method may further comprise allowing the cementitious composite rods to cure to provide the wall.

4 Claims, 9 Drawing Sheets

EXTRUDED WALLS AND METHOD OF FORMING EXTRUDED WALLS

TECHNICAL FIELD

The present disclosure generally relates to walls and, more specifically, to walls formed from extruded cementitious composite rods and to methods of fabricating such walls.

BACKGROUND

Cementitious construction materials, which are cement-containing or cement-like materials, are attractive for building and wall construction as such materials possess several advantageous properties. For example, cementitious materials are inherently strong and corrosion resistant. Concrete consists of a mixture of sand, aggregates (e.g., gravel, pebbles, etc.), and a cement paste composed of water and cement which is a binder that hydrates in the presence of water to form a non-water-soluble mineral that holds the aggregate of the concrete together. A concrete material that does not include coarse aggregate but contains only sand is called a mortar. A common type of cement is Portland cement which undergoes a chemical reaction in the presence of water that causes the cement to cure and harden. Specially formulated cementitious composites can be formulated to have higher strength properties and expanded applications compared with traditional Portland cement-based construction materials. For example, certain hybrid polymer/cement composites may be more cohesive and self-supporting than traditional Portland cement-based concretes and mortars.

Current methods for molding concrete walls involves pouring a slurry of paste and aggregate (or a slurry of cement paste alone) into a water-tight form in the shape of the desired wall. The cementitious material is then permitted to cure and harden by reaction with water, and the form is removed to provide a self-supporting wall. Other methods of fabricating cementitious-based columns involve feeding cementitious material into a vertically-movable form which moves upward and molds the cementitious material into a single column as it cures (see, for example, U.S. Pat. No. 1,894,676).

While effective, such methods, including the fabrication and use of the water-tight form, may be labor intensive and inefficient. Additional improved methods of fabricating cementitious material-based walls are still wanting. For example, it may be desirable to readily impart strength, ventilation, or even aesthetic properties into cementitious material-based walls using more efficient techniques. The present disclosure addresses these problems.

SUMMARY

In accordance with one aspect of the present disclosure, a wall is disclosed. The wall may be formed by a method comprising providing an extrusion platform having a plurality of perforations extending through a surface of the extrusion platform, and extruding a cementitious composite through the perforations of the extrusion platform to grow a plurality of cementitious composite rods each extending from a respective one of the perforations. The method may further comprise allowing the cementitious composite rods to cure to provide the wall.

In accordance with another aspect of the present disclosure, a method of forming a wall is disclosed. The method may comprise providing an extrusion platform having a surface with a plurality of perforations extending therethrough, and extruding a cementitious composite through the perforations of the extrusion platform to grow a plurality of cementitious composite rods extending from the extrusion platform. The perforations of the extrusion platform may mold a cross-sectional shape of the cementitious composite rods. The method may further comprise allowing the cementitious composite rods to cure to provide the wall.

In accordance with another aspect of the present disclosure, a wall is disclosed. The wall may comprise a header or a footer extending along a respective one of a top or a bottom of the wall, wherein the header or the footer has a surface with a plurality of perforations. The wall may further comprise a plurality of cementitious composite rods each extending from and being integral with a respective one of the perforations.

These and other aspects and features of the present disclosure will be more readily understood when read in conjunction with the accompanying drawings.

DETAILED DESCRIPTION

Figure 1:
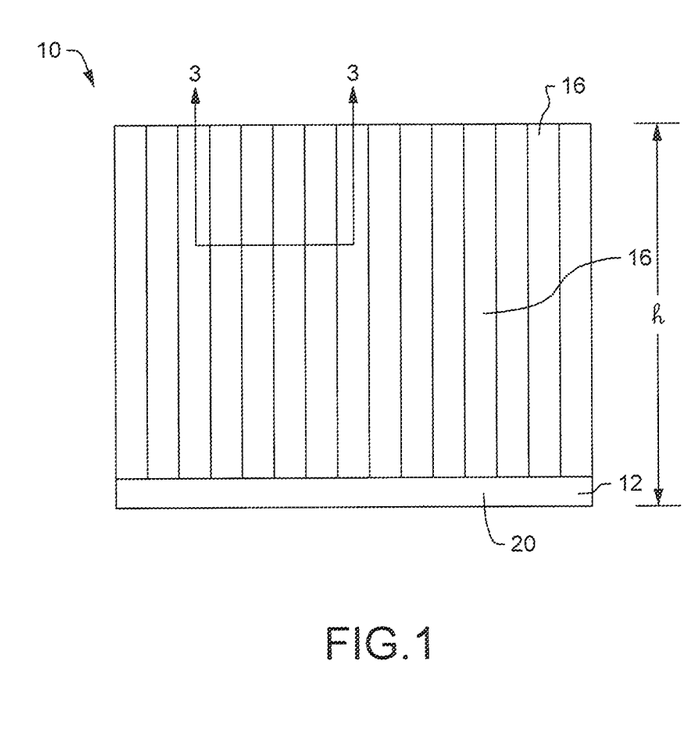
FIG. 1 is a front view of a wall consisting of cementitious composite rods and a footer, constructed in accordance with the present disclosure.
Figure 2:
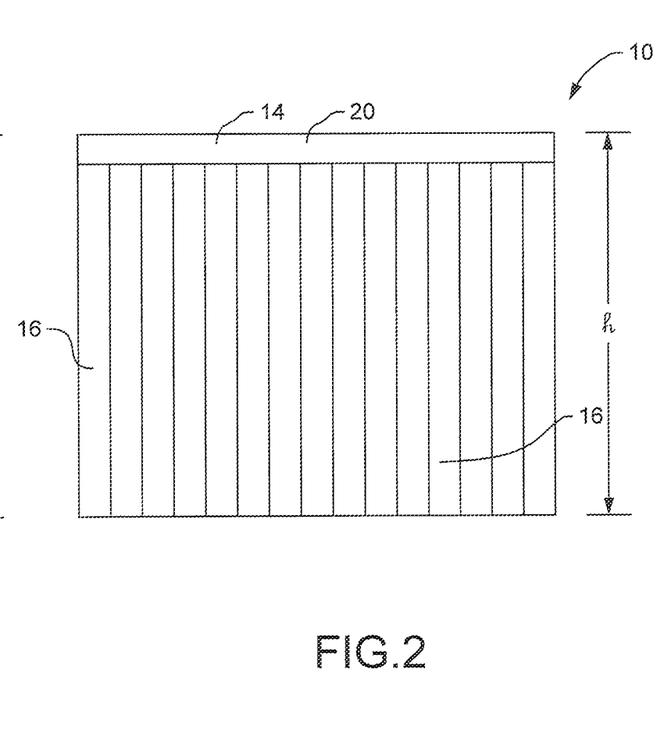
FIG. 2 is a front view of a wall similar to FIG. 2, but having a header instead of a footer, constructed in accordance with the present disclosure.

Referring now to the drawings, and with specific reference to FIGS. 1-2, a wall 10 is shown. As used herein, the wall 10 may be a stand-alone wall, a wall that is part of a room or building, or a structural component for various interior and exterior structures such as furniture or entertainment bars. The wall 10 may include a footer 12 along the bottom of the wall 10 (FIG. 1) or a header 14 along the top of the wall 10 (FIG. 2), as well as a plurality of cementitious composite rods 16 extending upwardly from the footer 12 or downwardly from the header 14 along the height (h) of the wall. In particular, the footer 12 or the header 14 of the wall 10 may include a plurality of perforations 18 from which the cement rods 16 extend, and the cementitious composite rods 16 may be integral with the footer 12 or the header 14 (see FIG. 6). As explained in further detail below, the footer 12 or the header 14 of the wall 10 may also function as an extrusion platform 20 through which the cementitious composite rods 16 are extruded.

The cementitious composite rods 16 may be formed from a cementitious composite that is self-supporting once cured and has similar hardness properties as traditional concrete. As used herein, a cementititious material is a material that contains cement or is cement-like, and a cementitious composite is a composite of a cementitious material. As a non-limiting example, the cementitious composite rods 16 may be formed from a hybrid polymer/cement composite containing a mixture of polymer, cement, and water. The polymer in the hybrid polymer/cement composite may be polyvinyl alcohol, although many other types of polymers may certainly be used. The hybrid polymer/cement composite may be a macro-defect free (MDF) cement that is substantially free of large voids or defects and is much less brittle than traditional mortars or concretes. As is understood in the art, a macro-defect free (MDF) cement is a special class of cementitious composites which rely on a polymeric processing aid to give a millable, high-viscosity material that hardens through a combination of ionic cross-linking of the polymer and cementitious reactions. In particular, the hybrid polymer/cement composite may be more cohesive than traditional Portland cement, such that the cementitious composite rods 16 formed therefrom may maintain an upright position during extrusion and after curing. However, the cementitious composite rods 16 may be formed from other types of extrudable and self-supporting materials as well such as, but not limited to, quick-curing acrylics or other suitable organic materials.

Figure 3:
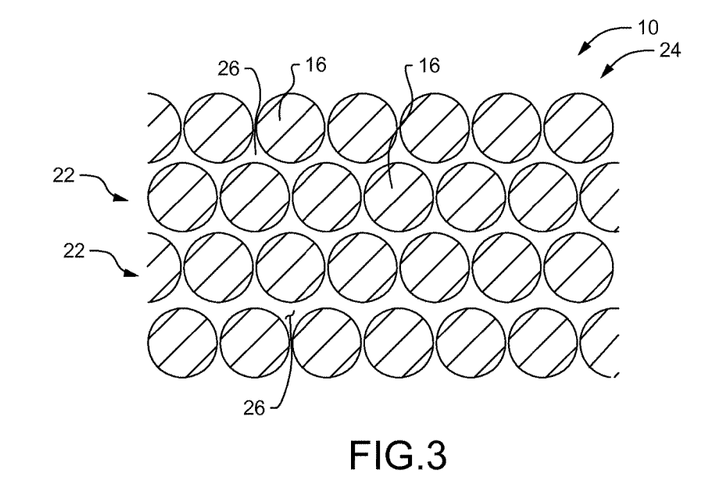
FIG. 3 is a cross-sectional view through the section 3-3 of FIG. 1, depicting a staggered arrangement of the cementitious composite rods in the wall, constructed in accordance with the present disclosure.

As shown in FIG. 3, the wall 10 may have one or more rows 22 of cementitious composite rods 16. If the wall 10 has two or more rows 22, the cementitious composite rods 16 in each row 22 may be offset with respect to the rods 16 in an adjacent row to provide a staggered arrangement 24 of the cementitious composite rods 16. The staggered arrangement 24 of the cementitious composite rods 16 may advantageously assist in blocking the passage of light through the wall 10 so as to maintain privacy and/or a desired internal brightness. It will be understood that the number of the rows 22 of cementitious composite rods 16 in the wall 10 may vary depending various design considerations, such as the desired strength of the wall and degree of insulation.

Figure 4:
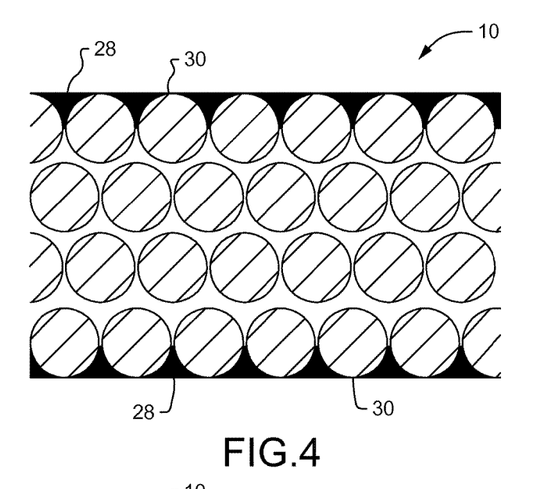
FIG. 4 is a cross-sectional view similar to FIG. 3, but having a filler applied to the outer surfaces of the wall, constructed in accordance with the present disclosure.
Figure 5:
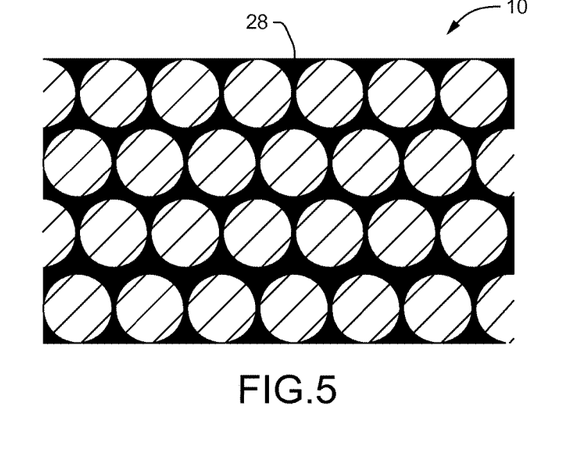
FIG. 5 is a cross-sectional view similar to FIG. 4, but having the filler applied throughout the gaps between the cementitious composite rods, constructed in accordance with the present disclosure.

In some arrangements, the wall 10 may be ventilated due to gaps 26 between the cementitious composite rods 16 which may permit the passage of air therethrough. Such ventilation properties may be beneficial, for example, in certain hotter climates where indoor cooling systems are not available. Alternatively, the wall 10 may be non-ventilated such that the passage of wind or air through the wall 10 is obstructed as shown in FIGS. 4-5. To obstruct the passage of air through the wall 10, a filler 28 may be applied to the gaps 26. As one possibility, the filler 28 may be applied to one or both of the outer surfaces 30 of the wall 10 as shown in FIG. 4. Alternatively, the filler 28 may be distributed throughout the wall to fill all of the gaps 26 between the cementitious composite rods 16, as shown in FIG. 5, or through certain sections of the wall 10. Suitable fillers for this purpose include plaster or other suitable materials that harden. In other alternative arrangements, the cementitious composite rods 16 may be densely packed in the wall 10 such that a filler is not necessary to obstruct the passage of air therethrough.

Figure 6:
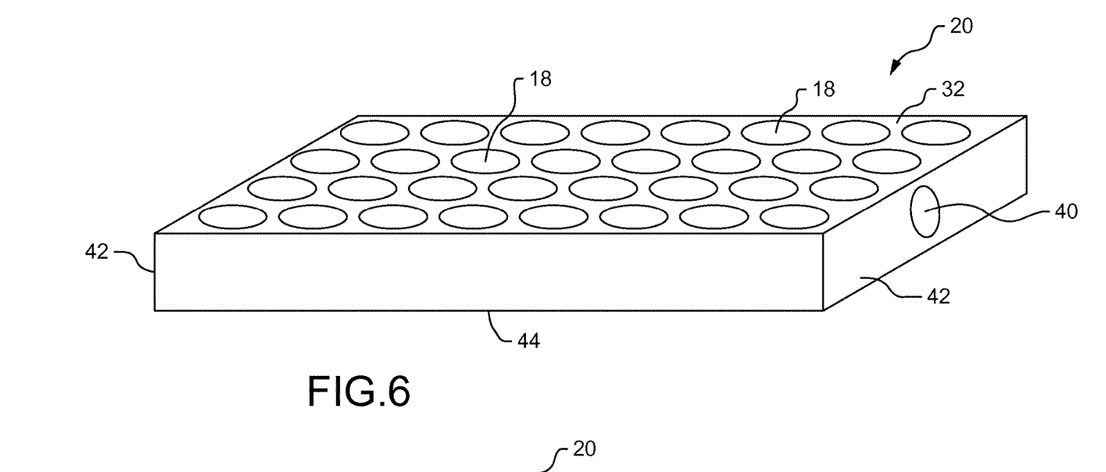
FIG. 6 is a side perspective view of an extrusion platform used to fabricate the wall, constructed in accordance with the present disclosure.
Figure 7:
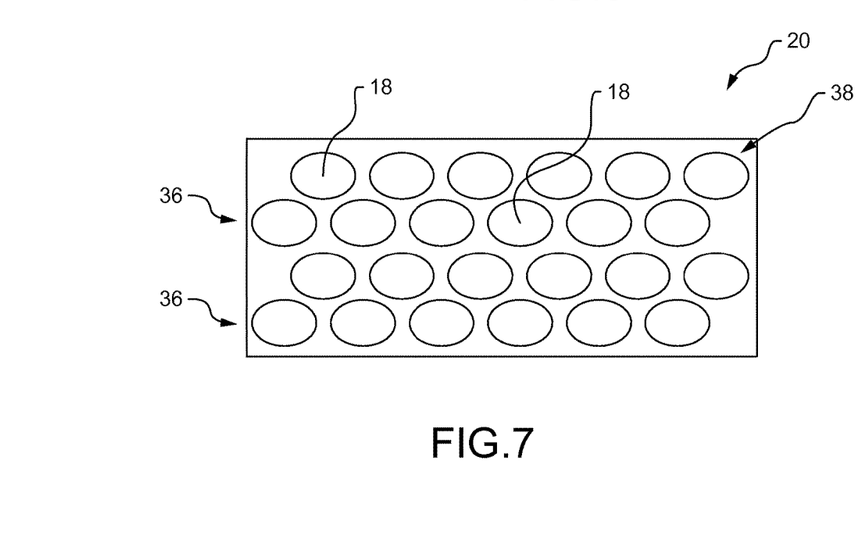
FIG. 7 is a top view of the extrusion platform of FIG. 6, depicting rows of perforations offset from each other in a staggered arrangement, constructed in accordance with the present disclosure.

Referring now to FIGS. 6-7, the extrusion platform 20, which ultimately provides the footer 12 or the header 14 of the wall 10, is shown in more detail. Although shown as a box-like structure, it will be understood that in practice the extrusion platform 20 may have any shape (such as curved shapes) suitable to support the design of the wall 10. In general, the extrusion platform 20 may have a surface 32 that includes a plurality of perforations 18 configured to mold each of the cementitious composite rods 16 into a desired cross-sectional shape as a cementitious composite, in the form of a dough, is extruded through the platform 20 (see further details below). Depending on the design of the wall 10, the perforations 18 may have identical shapes and dimensions or they may have shapes and dimensions that deviate from one another.

Figure 8:
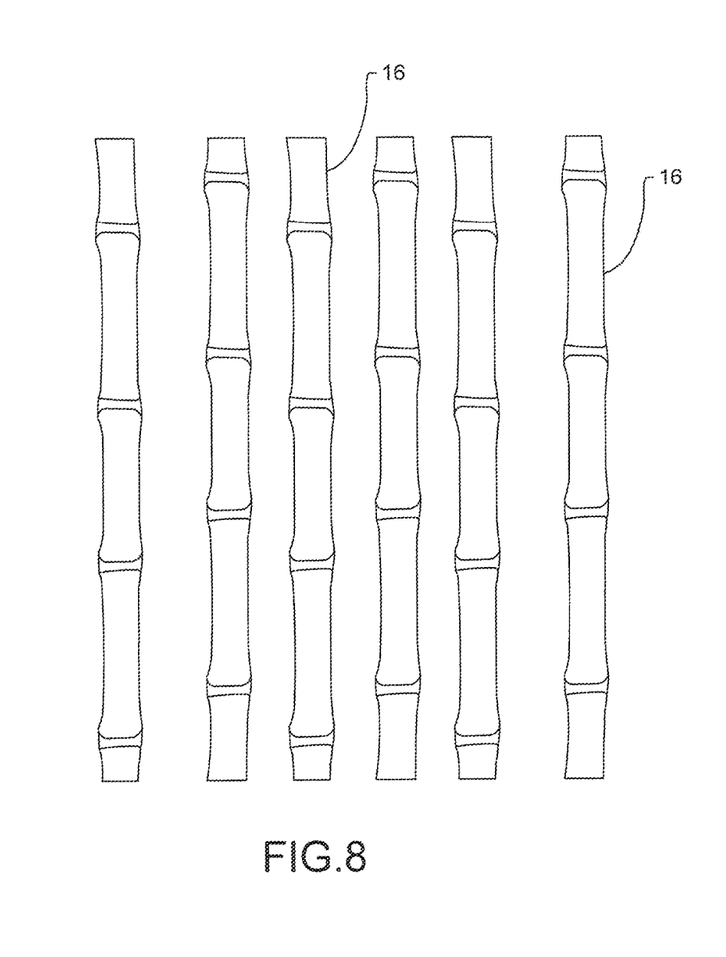
FIG. 8 is a partial front view of a bamboo-like wall having cementitious composite rods in the shape of bamboo, constructed in accordance with the present disclosure.
Figure 9:
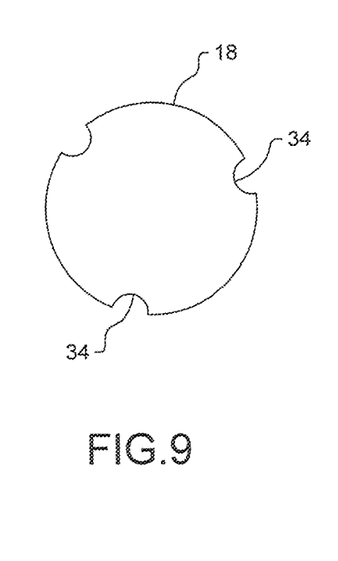
FIG. 9 is a top view of a perforation of the extrusion platform having internal notches to produce streaks in a cementitious composite rod, constructed in accordance with the present disclosure.

In order to mold the cross-sectional shapes of the cementitious composite rods 16, the perforations 18 may have shapes and dimensions that mirror the desired cross-sectional shapes and dimensions of the cementitious composite rods 16. For example, to produce cementitious composite rods having a circular or ovular cross-sectional shape, the perforations 18 of the platform 20 may be circular or ovular. However, the perforations 18 may have a number of alternative shapes to afford desired functional or aesthetic properties to the final wall 10. As one non-limiting example, it may be desirable to provide a tiki hut-like wall having cementitious composite rods 16 with random angles and/or streaks that resemble bamboo (see FIG. 8). To introduce streaks into the cementitious composite rods 16, the perforations 18 may include one or more internally- (or externally-) extending notches 34 (see FIG. 9). In addition, the cementitious composite dough may include one or more dyes to introduce a desired color into the cementitious composite rods 16, such as a tan or green color if the cementitious composite rods 16 are intended to have a bamboo-like appearance.

The extrusion platform 20 may further include one or more rows 36 of perforations 18 (see FIG. 7). For example, to mold the staggered arrangement 24 of the cementitious composite rods 16, the platform 20 may have two or more rows 36 of perforations 18 in which the perforations 18 in a given row 36 are offset with respect to the perforations 18 in an adjacent row 36 to produce a staggered arrangement 38. The staggered arrangement 38 of the perforations 18 may correspond to and mirror the staggered arrangement 24 of the cementitious composite rods 16 in the wall 10. It will be understood, however, that the number or rows and the distribution of the perforations 18 in practice may vary depending on a number of design considerations.

Figure 10:
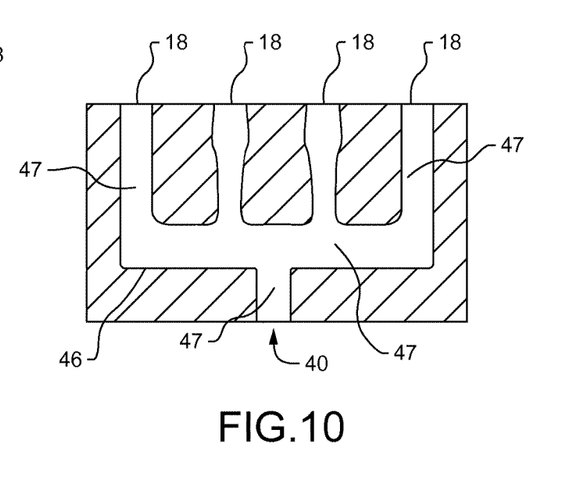
FIG. 10 is a cross-sectional view of an extrusion platform having an internal manifold leading from an opening of the extrusion platform to the perforations, constructed in accordance with the present disclosure.

Referring back to FIG. 6, the extrusion platform 20 may also include one or more openings 40 through which a cementitious composite dough is pumped or otherwise pushed into the platform 20 for extrusion. The opening 40 may be provided on one or both sides 42 of the platform 20 and/or a bottom 44 of the platform 20 as needed to provide suitable flow dynamics of the cementitious composite through the platform. In one arrangement, the extrusion platform 20 may be internally hollow to allow the cementitious composite dough to fill the platform 20 and extrude through the perforations 18. Alternatively, the extrusion platform 20 may include an internal manifold 46 with a plurality of connected internal channels 47 that guide the cementitious composite from the opening(s) 40 to each of the perforations 18, as shown in FIG. 10. The dimensions, diameters, and curvature of the each of the internal channels 47 of the manifold 46 may be varied to optimize the flow dynamics of the cementitious composite and provide uniform flow rates to each of the perforations 18 and equivalent rod growth rates. In particular, the channels 47 that are farther from the inlet 40 and have longer flow lengths may have wider diameters, whereas the channels that are closer to the inlet 40 and have shorter flow lengths may have narrower diameters such that the flow rates through each of the channels 47 are about the same. For example, as shown in FIG. 10, the two inside channels 47 that are closer to the inlet 40 have narrower diameters, and the two outside channels that are further from the inlet 40 have wider channels 47. However, the diameters of the exits of each of the channels 47 near the perforations 18 may be about the same, as shown. It will be understood, however, that the number of channels 47 in the manifold 46, their relative diameters, as well as the relative angles therebetween may, of course, vary depending on such factors as the number and location of the inlets/openings 40, the number and location of the perforations 18, and the desired flow dynamics.

Figure 11:
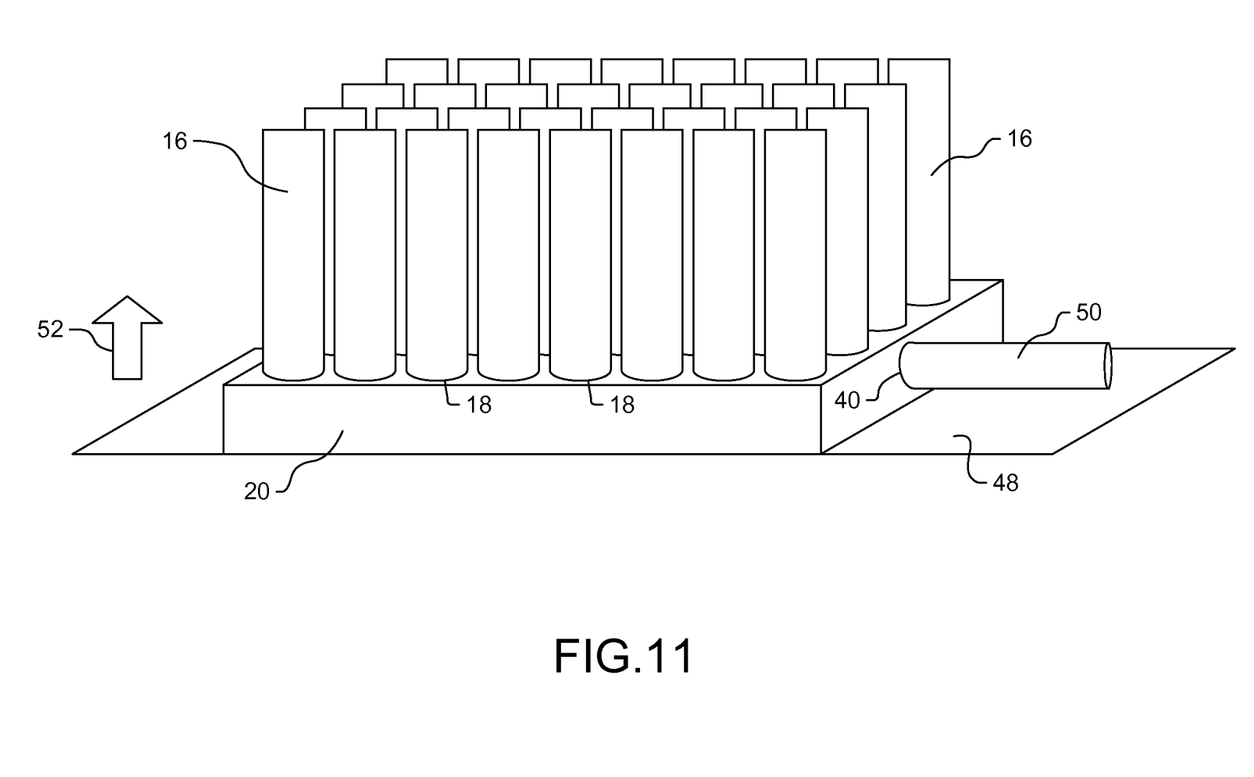
FIG. 11 is a schematic representation of extruding a cementitious composite through the extrusion platform to cause the upward growth of the cementitious composite rods from the extrusion platform, in accordance with a method of the present disclosure.
Figure 12:
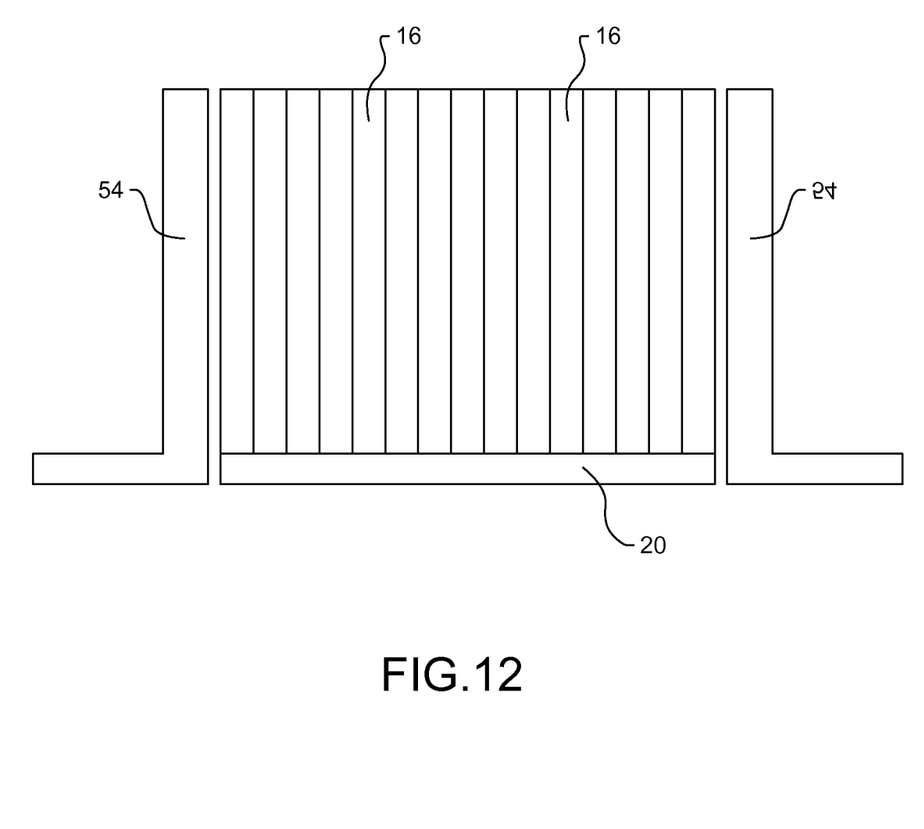
FIG. 12 is a schematic representation of using a guide to hold the cementitious composite rods upright, constructed in accordance with a method of the present disclosure.

Turning now to FIG. 11, one possible approach to produce the wall 10 is shown. In this approach, the extrusion platform 20 may be placed on a support structure 48 with the perforations 18 facing upward and away from the support structure 48. As used herein, the support structure 48 may be the ground or any other support structure capable of supporting the weight of the wall 10. One or more hoses 50 (or other suitable structures such as tubes, etc.) may be connected to the opening(s) 40 of the extrusion platform 20 to permit a cementitious composite dough to be pumped or pushed into the platform 20 while the platform 20 remains fixed in position on the support structure 48. The cementitious composite dough may then extrude through the perforations 18 to allow an upward growth 52 of the cementitious composite rods 16 from the extrusion platform 20 while the perforations 18 mold the cross-sectional shape of the cementitious composite rods 16. The cementitious composite rods 16 may continue the upward growth 52 until reaching a desired wall height, after which the cementitious composite rods 16 may be permitted to cure and harden. As explained above, due to the cohesive properties of the cementitious composite dough, the cementitious composite rods 16 may be sufficiently self-supporting to maintain an upright position as the cementitious composite rods 16 are extruded through the platform 20. However, in some circumstances, one or more guides 54 may be optionally positioned against the growing rods 16 to prevent the rods from buckling and assist in holding the rods vertically upright (see FIG. 12). The guides 54 may take the form of a brace or a block that leans against the growing rods 16 to hold them upright, although other types of guides may certainly be used. In any event, once the extrusion and curing is complete, the extrusion platform 20 may be left in position to provide the footer 12 for the wall 10, as shown in FIG. 1.

Figure 13:
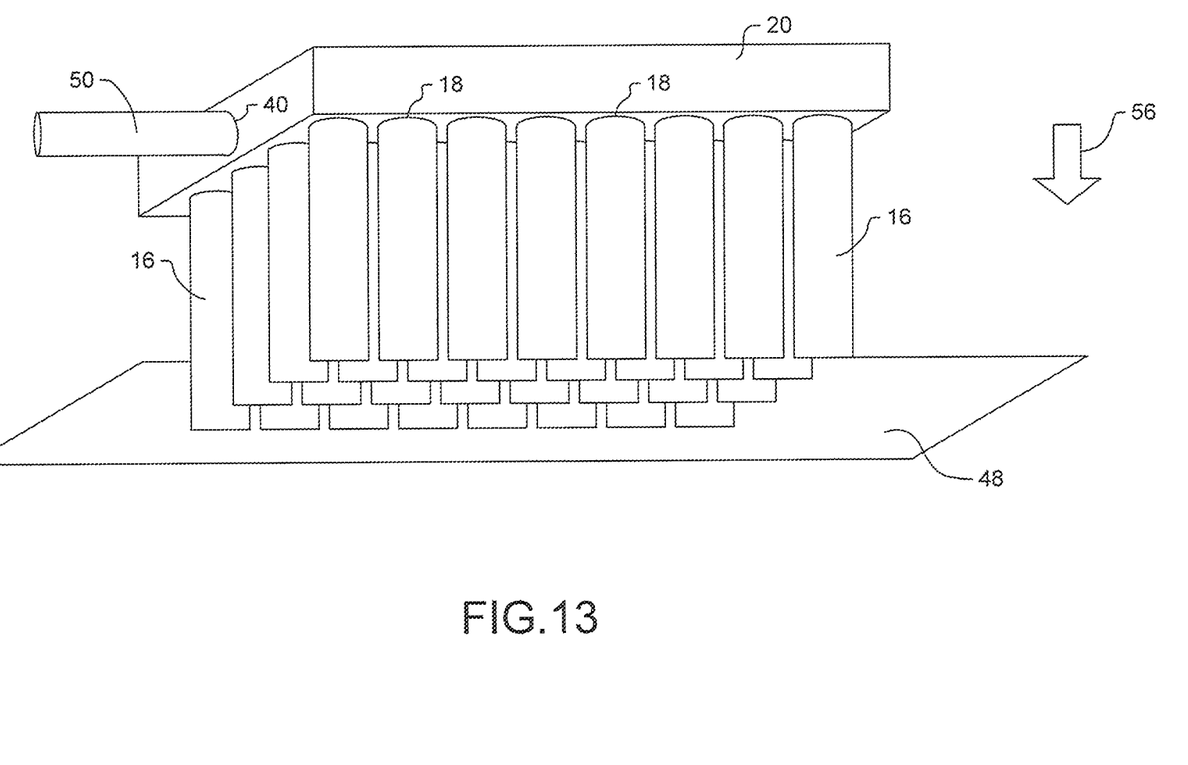
FIG. 13 is a schematic representation of extruding the cementitious composite through the extrusion platform to cause the downward growth of the cementitious composite rods from the extrusion platform, in accordance with another method of the present disclosure.

As an alternative approach to produce the wall 10, the extrusion platform 20 may be suspended at a fixed position above the support structure 48 at a desired wall height, such as with a stilts, with the perforations 18 facing downward and toward the support structure 48 (see FIG. 13). The cementitious composite dough may be pumped or otherwise pushed though the platform 20 with the hose 50 or another suitable structure. When the cementitious composite rods 16 are extruded through the platform 20, downward growth 56 of the cementitious composite rods 16 from the platform 20 toward the support structure 48 may occur. In this way, gravity may advantageously assist the downward growth 56 of the cementitious composite rods 16 and assist in maintaining the rods 16 in a vertically upright position, such that a guide may not be needed. Once the cementitious composite rods 16 have cured, the extrusion platform 20 may be left in place on top of the cementitious composite rods 16 as the header 14 for the wall 10, as shown in FIG. 2.

Figure 14:
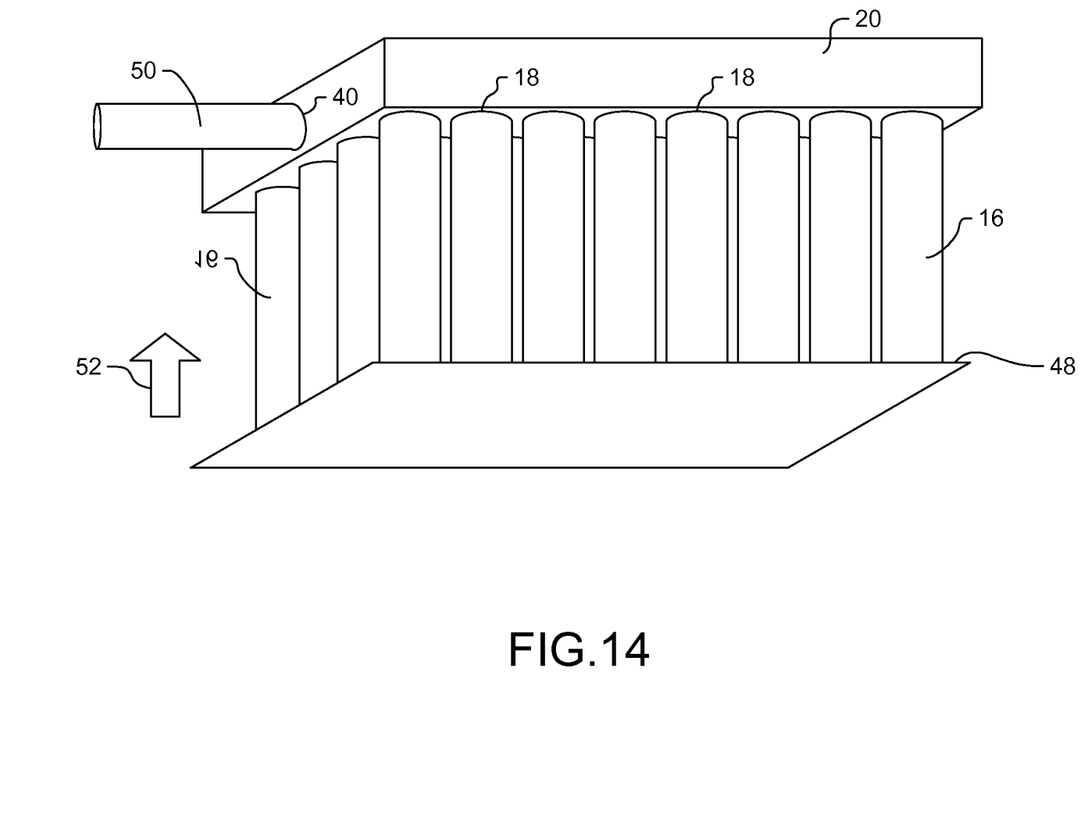
FIG. 14 is a schematic representation of extruding the cementitious composite through the extrusion platform to cause the upward growth of the cementitious composite rods and the upward movement of the extrusion platform, in accordance with another method of the present disclosure.

As yet another alternative strategy to produce the wall 10, the extrusion platform 20 may be placed on the support structure 48 with the perforations 18 facing downward toward the support structure 48 so that the upward growth 52 of the cementitious composite rods 16 from the support structure 48 is concurrent with the upward movement of the platform 20 until it reaches a desired wall height (see FIG. 14). The cementitious composite rods 16 may be permitted to cure and harden, and the platform 20 may be left in place on top of the cementitious composite rods 16 as the header 14 for the wall 10, as shown in FIG. 2. It is further noted here that other alternative approaches in which the cementitious composite rods 16 grow horizontally or at an angle with respect to the support structure 48 and/or the extrusion platform 20 are also encompassed within the scope of the present disclosure.

INDUSTRIAL APPLICABILITY

The teachings of the present disclosure may find industrial applicability in a variety of settings such as, but not limited to, building construction and other infrastructure construction applications. The technology disclosed herein provides a wall formed from a plurality of cementitious composite rods that are extruded through an extrusion platform. The extrusion platform may also provide a footer or a header for the wall when the extrusion process is complete. The cementitious composite rods are formed from a self-supporting cementitious composite, such as a hybrid polymer/cement composite, that cures to a hardened state that is similar to traditional concrete. Notably, the cementitious composite rods may be extruded in a range of shapes and colors to provide desired physical properties and/or aesthetic appeal to the final wall product. As one non-limiting example, the wall may have cementitious composite rods with bamboo-like shapes and colors to give the wall a tiki but appearance.

Figure 15:
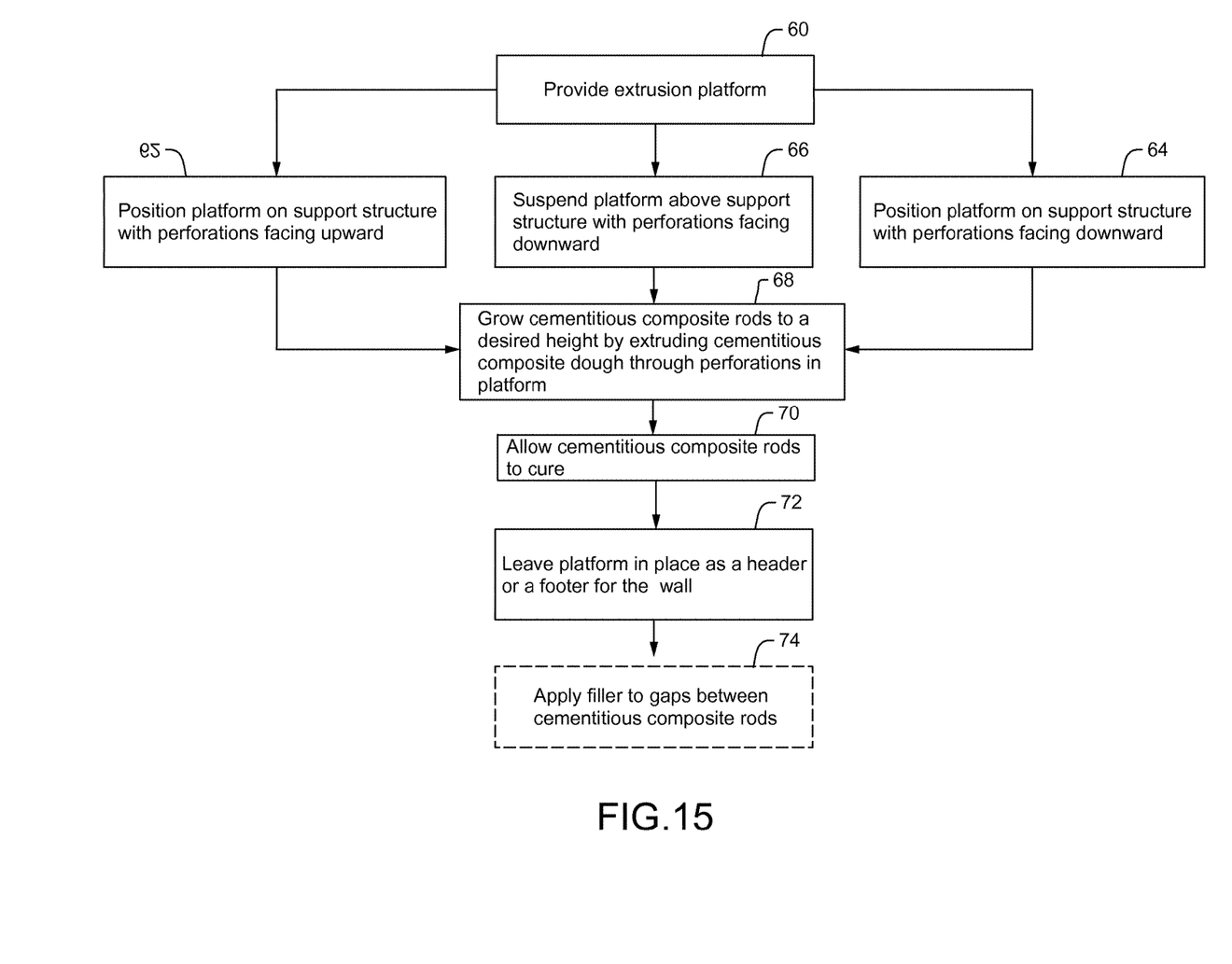
FIG. 15 is a flowchart of a series of steps that may be involved in fabricating the wall, in accordance with a method of the present disclosure.

A series of steps that may be involved in the fabrication of the wall 10 of the present disclosure is shown in FIG. 15. Beginning with a first block 60, the extrusion platform 20 having perforations 18 with shapes, dimensions, and a distribution that match the desired cross-sectional shapes, dimensions, and distribution of the cementitious composite rods 16 may be provided. Depending on the selected approach to grow the cementitious composite rods 16, the extrusion platform 20 may be positioned on the support structure 48 with the perforations 18 facing upward (block 62/FIG. 11) or downward (block 64/FIG. 14). Alternatively, the extrusion platform 20 may be suspended above the support structure 48 with a suitable supporting device (e.g., stilts, etc.) at a desired wall height with the perforations 18 facing downward (block 66/FIG. 13). Subsequent extrusion of a cementitious composite in the form of a dough through the perforations 18 of the extrusion platform 20 may allow the upward growth 52 (FIG. 11) or the downward growth 56 (FIGS. 13 and 14) of the cementitious composite rods 16 from the platform 20 to a length corresponding to the desired wall height (block 68). Optionally, one or more guides 54 may be positioned against the growing rods to further support their vertically upright growth during the block 68 if needed (see FIG. 12).

Once developed to the desired wall height, the cementitious composite rods 16 may be permitted to cure and harden (block 70), and the extrusion platform 20 may be left in position along the bottom or the top of the cementitious composite rods 16 to respectively provide either the footer 12 or the header 14 of the wall 10 (block 72). If gaps 26 exist between the cementitious composite rods 16 and a non-ventilated wall is desired, the filler 28 may be applied to the wall to obstruct air flow through the wall according to an optional block 74 (also see FIGS. 4-5). For example, the block 74 may be achieved by applying plaster to the wall 10 using a trowel or other tool, although other types of fillers may certainly be used.

Accordingly, it can be seen from the above that the wall disclosed herein may be fabricated by a more efficient and less labor intensive method than those used in current systems. In particular, the extrusion platform disclosed herein may be easier to handle and manufacture than large, water-tight concrete wall forms of the prior art. The perforations of the platform also offer the option to readily tailor the shapes and distribution of the cementitious composite rods according to desired wall properties. It is expected that the technology disclosed herein may find wide industrial applicability in a wide range of areas such as, but not limited to, construction, design, and architectural applications.

What is claimed is:

1. A method of forming a wall, comprising:
providing an extrusion platform having a surface with a plurality of perforations extending therethrough;
extruding a cementitious composite through the perforations of the extrusion platform to grow a plurality of cementitious composite rods extending from the extrusion platform by at least placing the extrusion platform at a desired wall height above a support structure with the perforations facing downward and toward the support structure, and causing a downward growth of the cementitious composite rods from the extrusion platform to the support structure, the perforations of the extrusion platform molding a cross-sectional shape of the cementitious composite rods; and
allowing the cementitious composite rods to cure to provide the wall.

2. The method of claim 1, further comprising leaving the extrusion platform in place as a header for the wall after allowing the cementitious composite rods to cure.

3. The method of claim 1, wherein the cementitious composite comprises a hybrid polymer and cement composite.

4. The method of claim 1, wherein the cementitious composite comprises a macro-defect free cement.

* * * * *